US009460735B2

(12) United States Patent
Dadu et al.

(10) Patent No.: US 9,460,735 B2
(45) Date of Patent: Oct. 4, 2016

(54) INTELLIGENT ANCILLARY ELECTRONIC DEVICE

(71) Applicant: Intel Corporation, Santa Clara, CA (US)

(72) Inventors: Saurabh Dadu, Tigard, OR (US); Saurin Shah, Portland, OR (US); Francis M. Tharappel, Portland, OR (US); Lakshman Krishnamurthy, Portland, OR (US); Brian K. Vogel, Santa Clara, CA (US); Swarnendu Kar, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 62 days.

(21) Appl. No.: 14/142,818

(22) Filed: Dec. 28, 2013

(65) Prior Publication Data
US 2015/0187369 A1 Jul. 2, 2015

(51) Int. Cl.
| | |
|---|---|
| *G10L 21/00* | (2013.01) |
| *G10L 15/04* | (2013.01) |
| *G10L 17/00* | (2013.01) |
| *G10L 25/48* | (2013.01) |
| *G06F 3/16* | (2006.01) |
| *G10L 15/28* | (2013.01) |

(52) U.S. Cl.
CPC ............... *G10L 25/48* (2013.01); *G06F 3/16* (2013.01); *G10L 15/28* (2013.01)

(58) Field of Classification Search
None
See application file for complete search history.

(56) References Cited

U.S. PATENT DOCUMENTS

| | | | |
|---|---|---|---|
| 5,983,186 A | 11/1999 | Miyazawa et al. | |
| 6,070,139 A | 5/2000 | Miyazawa et al. | |
| 8,468,023 B1 * | 6/2013 | Stracke, Jr. ............. | G06F 3/167 455/569.1 |
| 2002/0077830 A1 | 6/2002 | Suomela et al. | |
| 2003/0115064 A1 | 6/2003 | Gusler et al. | |
| 2010/0036660 A1 | 2/2010 | Bennett | |
| 2011/0066634 A1 | 3/2011 | Phillips et al. | |
| 2012/0191449 A1 | 7/2012 | Lloyd et al. | |
| 2013/0080167 A1 | 3/2013 | Mozer | |
| 2013/0223635 A1 * | 8/2013 | Singer .................. | H04R 1/1041 381/56 |
| 2013/0339028 A1 | 12/2013 | Rosner et al. | |
| 2014/0095163 A1 * | 4/2014 | Stracke, Jr. ............. | G06F 3/167 704/251 |
| 2014/0214429 A1 * | 7/2014 | Pantel ..................... | G10L 21/16 704/275 |
| 2015/0221307 A1 | 8/2015 | Shah et al. | |

FOREIGN PATENT DOCUMENTS

WO  2015/094369 A1  6/2015

OTHER PUBLICATIONS

International Search Report and Written Opinion received for International Patent Application No. PCT/US2014/067327, mailed on Feb. 16, 2015, 11 pages.
International Search Report and Written Opinion received for PCT Patent Application No. PCT/US2013/077222, mailed on Sep. 30, 2014, 10 pages.

* cited by examiner

*Primary Examiner* — Satwant Singh
(74) *Attorney, Agent, or Firm* — Alpine Technology Law Group LLC

(57) ABSTRACT

In one example a controller comprises logic, at least partially including hardware logic, configured to detect a key phrase in a received audio signal, and in response to the key phrase, to transmit a signal to a personal assistant in a remote electronic device, determine whether an audio input was received, and in response to a determination that additional audio input was received prior to receiving a response from the personal assistant in the remote electronic device, to buffer the audio input in a memory and forward the audio input to the personal assistant in the remote electronic device. Other examples may be described.

12 Claims, 10 Drawing Sheets

INTELLIGENT ANCILLARY ELECTRONIC DEVICE

RELATED APPLICATIONS

None.

BACKGROUND

The subject matter described herein relates generally to the field of electronic devices and more particularly to intelligent ancillary electronic devices.

Many electronic devices such as laptop computers, netbook style computers, tablet computers, mobile phones, electronic readers, and the like have communication capabilities, e.g., voice and text messaging, built into the devices. In some circumstances it may be useful to communicate with such electronic devices using an interface on ancillary electronic devices such as headsets, computer-equipped glasses, or the like.

Further, many networked electronic devices now offer personal assistant services which interact with users of the electronic devices via a voice-based interface. In such circumstances it may be useful to communicate with the personal assistant services via an interface on ancillary electronic devices such as headsets, computer-equipped glasses, or the like Accordingly systems and techniques to provide for intelligent ancillary electronic devices may find utility.

BRIEF DESCRIPTION OF THE DRAWINGS

The detailed description is described with reference to the accompanying figures.

DETAILED DESCRIPTION

Figure 1:
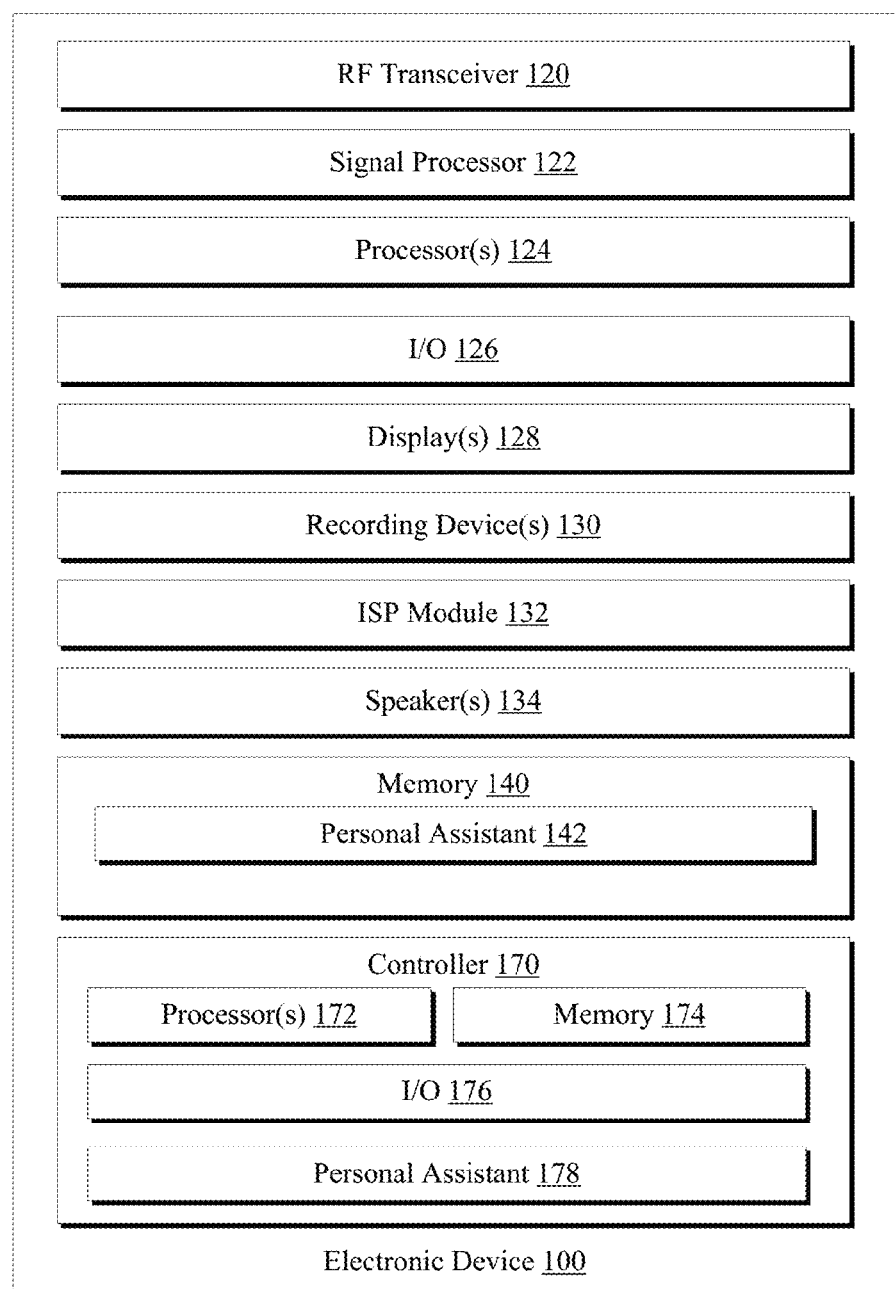
FIG. 1 is a illustrations of exemplary electronic devices which may be adapted to work with intelligent recording in accordance with some examples.

Described herein are exemplary systems and methods to implement intelligent ancillary electronic devices. In the following description, numerous specific details are set forth to provide a thorough understanding of various examples. However, it will be understood by those skilled in the art that the various examples may be practiced without the specific details. In other instances, well-known methods, procedures, components, and circuits have not been illustrated or described in detail so as not to obscure the particular examples.

Briefly, the subject matter described here addresses concerns set forth above at least in part by providing an intelligent ancillary electronic device which includes a controller with logic to manage communication with a remote electronic device. For example, the remote electronic device may be embodied as a mobile communication or computing device, a mobile phone or the like, and the ancillary electronic device may be embodied as a wearable device such as an earpiece, a headset or the like.

The controller in the ancillary electronic device may implement operations which enable the ancillary electronic device to interact with a personal assistant which executes on a remote electronic device in a "one shot" mode in which the ancillary electronic device does not wait for ready response signals from the personal assistant. Operating in a one shot mode enables a more natural user interaction with the personal assistant. Further, operating in a one shot mode manages delays inherent in the communication process between the personal assistant and the ancillary electronic device.

In some examples a controller in the ancillary electronic device may comprise logic which detects a key phrase in a received audio signal. For example, a personal assistant may provide a pre-configured key phrase such as "Hello Jarvis" that activates the personal assistant. Alternatively, a user may enter a customized key phrase during a configuration process. When the key phrase is detected in an audio input (e.g., a microphone) in the ancillary device the logic transmit a signal to the personal assistant in a remote electronic device to activate the personal assistant.

The logic on the ancillary electronic device then monitors the audio input device for further audio input from a user. In the event that additional audio input is received at the audio input device prior to receiving a response from the personal assistant manager in the remote electronic device, the controller configures the ancillary electronic device to operate in a one-shot mode. While operating in a one-shot mode the ancillary electronic device buffers audio input from a user in a memory and forwards the audio input to the personal assistant in the remote electronic device at an appropriate time.

Thus, a user of the ancillary electronic device is able to interact with the personal assistant without having to wait for ready prompts from the personal assistant.

Specific features and details will be described with reference to FIGS. 1-10, below.

FIG. 1 is a schematic illustration of an example of a remote electronic device 100 which may be coupled to a remote electronic device. In some aspects remote electronic device 100 may be embodied as a mobile telephone, a tablet computing device, a personal digital assistant (PDA), a notepad computer, a video camera, a wearable device like a smart watch, smart wrist band, smart headphone, or the like. The specific embodiment of remote electronic device 100 is not critical.

In some examples remote electronic device 100 may include an RF transceiver 120 to transceive RF signals and a signal processing module 122 to process signals received by RF transceiver 120. RF transceiver 120 may implement a local wireless connection via a protocol such as, e.g., Bluetooth or 802.11X. IEEE 802.11a, b or g-compliant interface (see, e.g., IEEE Standard for IT-Telecommunications and information exchange between systems LAN/MAN—Part II: Wireless LAN Medium Access Control (MAC) and Physical Layer (PHY) specifications Amendment 4: Further Higher Data Rate Extension in the 2.4 GHz Band, 802.11G-2003). Another example of a wireless interface would be a general packet radio service (GPRS) interface (see, e.g., Guidelines on GPRS Handset Requirements, Global System for Mobile Communications/GSM Association, Ver. 3.0.1, December 2002).

Remote electronic device 100 may further include one or more processors 124 and memory 140. As used herein, the term "processor" means any type of computational element, such as but not limited to, a microprocessor, a microcontroller, a complex instruction set computing (CISC) microprocessor, a reduced instruction set (RISC) microprocessor, a very long instruction word (VLIW) microprocessor, or any other type of processor or processing circuit. In some examples, processor 124 may be one or more processors in the family of processors available from Intel® Corporation of Santa Clara, Calif. Alternatively, other processors may be used, such as Intel's Itanium®, XEON™, ATOM™, and Celeron® processors. Also, one or more processors from other manufactures may be utilized. Moreover, the processors may have a single or multi core design.

In some examples, memory 140 includes random access memory (RAM); however, memory module 140 may be implemented using other memory types such as dynamic RAM (DRAM), synchronous DRAM (SDRAM), and the like. Memory 140 may comprise one or more applications including a personal assistant 142 which execute on the processor(s) 124

Remote electronic device 100 may further include one or more input/output devices 126 such as, e.g., a keypad, touchpad, microphone, or the like, and one or more displays 128, speakers 134, and one or more recording devices 130. By way of example, recording device(s) 130 may comprise one or more cameras and/or microphones An image signal processor 132 may be provided to process images collected by recording device(s) 130.

In some examples remote electronic device 100 may include a low-power controller 170 which may be separate from processor(s) 124, described above. In the example depicted in FIG. 1 the controller 170 comprises one or more processor(s) 172, a memory module 174, and an I/O module 176. In some examples the memory module 174 may comprise a persistent flash memory module and the I/O module 176 may be implemented as logic instructions encoded in the persistent memory module, e.g., firmware or software. The I/O module 176 may comprise a serial I/O module or a parallel I/O module. Again, because the adjunct controller 170 is physically separate from the main processor(s) 124, the controller 170 can operate independently while the processor(s) 124 remains in a low-power consumption state, e.g., a sleep state. Further, the low-power controller 170 may be secure in the sense that the low-power controller 170 is inaccessible to hacking through the operating system.

In some examples an instance of the personal assistant 178 may execute on controller 170. The instance of personal assistant 178 may have the full functionality of the personal assistant 142 in memory 140. In alternate examples the instance of the personal assistant 178 which executes on controller 170 may include only a portion of the functionality of the personal assistant 142 stored in memory 140. For example, the instance of the personal assistant 178 may provide a front-end access service to receive and respond to requests for the personal assistant 142, e.g., when the processor(s) 124 are in a low-power or sleep state. The personal assistant 178 may receive requests for service from the personal assistant 142 and may implement an authentication process to ensure that the requestor is authorized to use the personal assistant 142. For example, the personal assistant 178 may collect a password, match a voice print, or implement another authentication technique. The personal assistant 178 may then wake the processor(s) 124 from a low-power or sleep state and pass the request to personal assistant 142.

Figure 2:
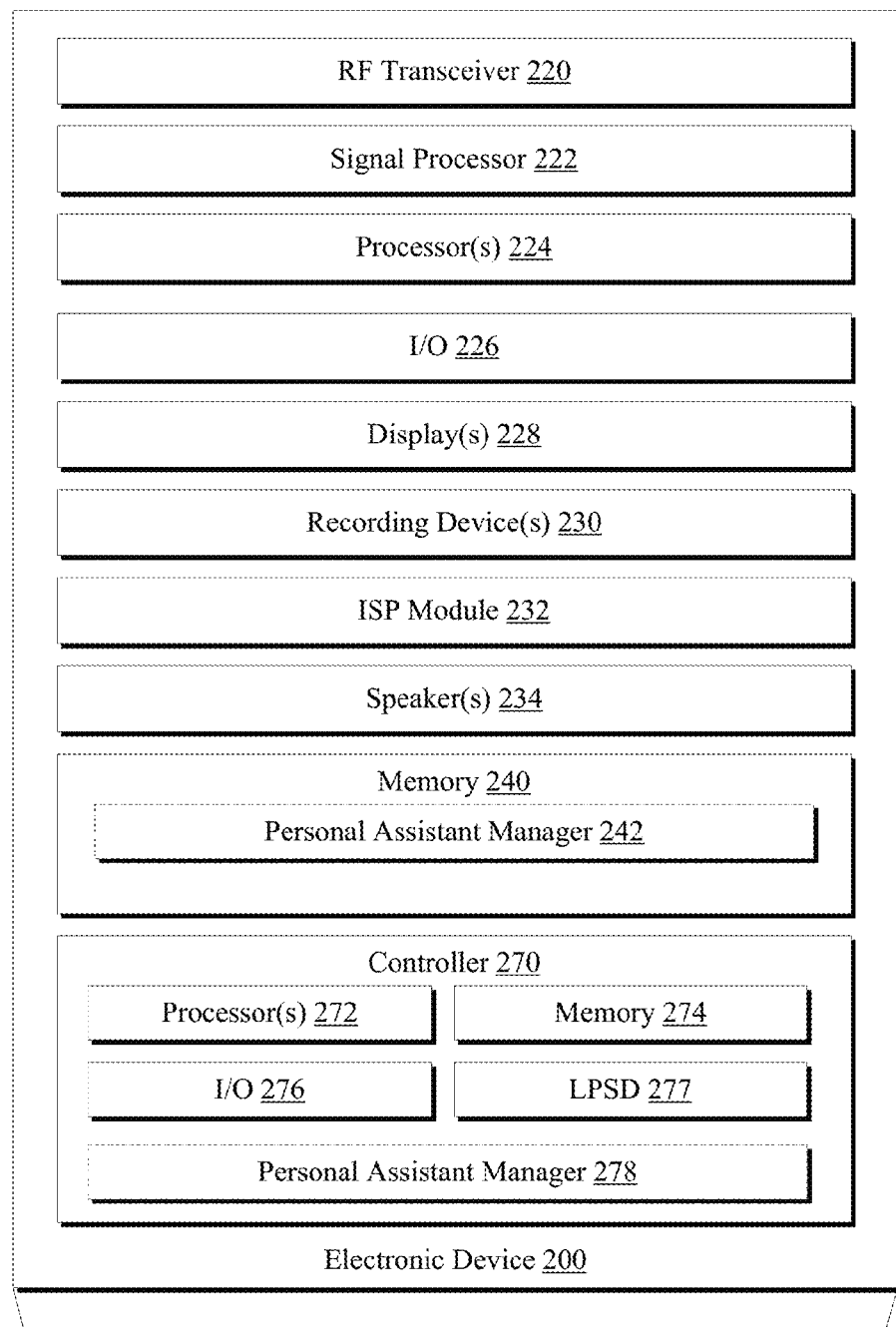
FIG. 2 is a schematic illustration of components of an intelligent ancillary electronic device in accordance with some examples.

FIG. 2 is a schematic illustration of components of an intelligent ancillary electronic device 200 in accordance with some examples. Many of the components of ancillary electronic device 200 may be the same as the corresponding components for the remote electronic device 100 depicted in FIG. 1. In the interest of brevity and clarity, the description of these components will not be repeated.

The ancillary electronic device 200 depicted in FIG. 2 includes a low-power speech detector (LPSD) 277. For example, the LPSD 277 may be implemented as a low-power consumption controller which is always on and periodically monitors input from a microphone on ancillary electronic device. In some examples LPSD 277 may include voice recognition module such that LPSD responds only to one or more recognized voices.

As illustrated in FIG. 2, in some examples the ancillary electronic device 200 may be implemented as a wearable electronic device such as an earpiece or a headset.

Figure 3:
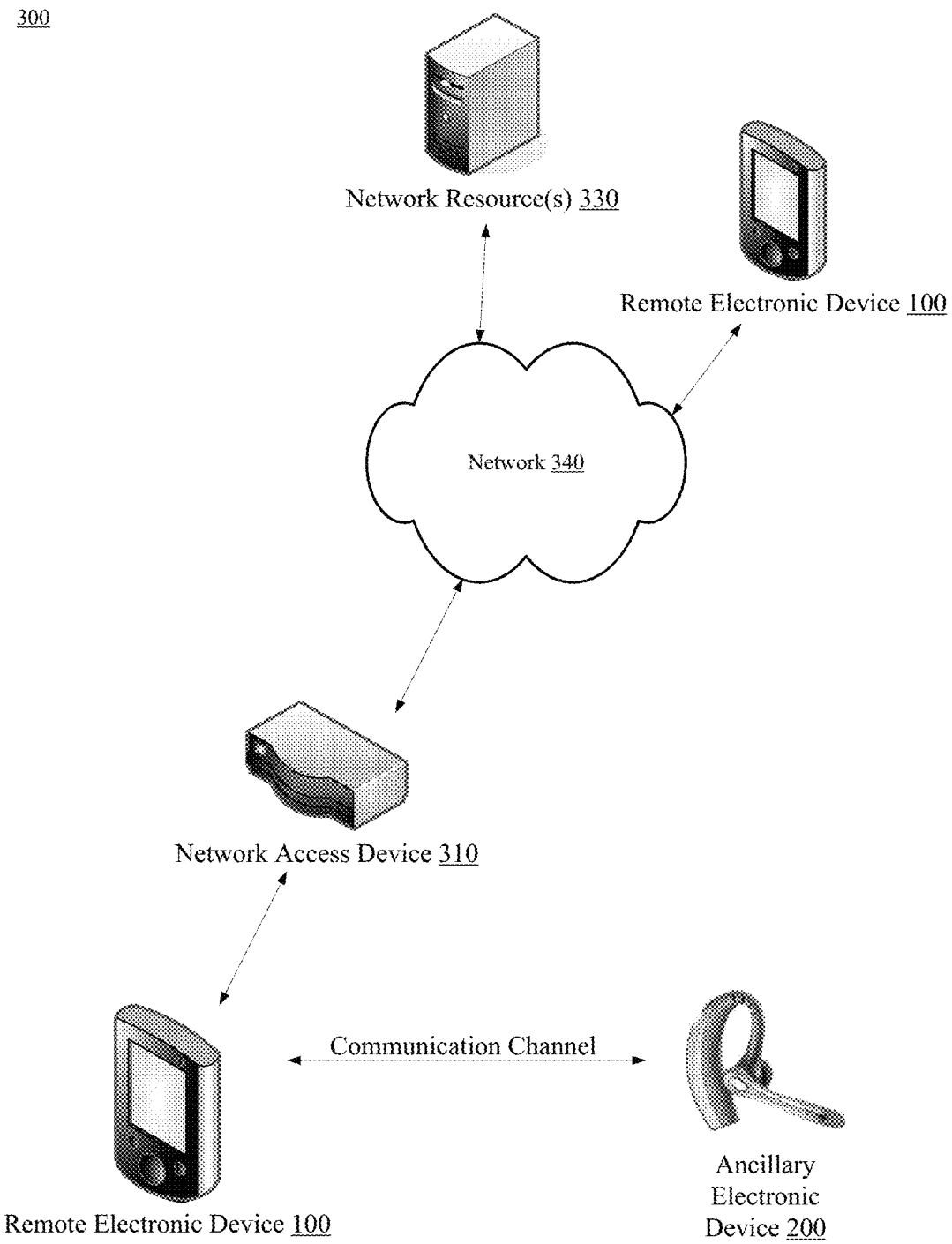
FIG. 3 is a high-level schematic illustration of an environment in which intelligent ancillary electronic devices may be implemented in accordance with some examples.

FIG. 3 is a high-level schematic illustration of an environment in which intelligent ancillary electronic devices may be implemented in accordance with some examples. Referring to FIG. 3, in some environments a remote electronic device 100 as described above may be within range to establish a communication channel with one or more ancillary electronic devices 200. For example, the communication channel between remote electronic device 100 and ancillary electronic device 200 may be a wireless communication channel, a wired communication channel, an optical communication channel, or the like.

Remote electronic device 100 may also be coupled to a network access device 310 by a communication channel. For example, network access device 310 may be embodied as a network access device (e.g., a router, base station or the like) which provides remote electronic device 100 with access to one or more network resources 330 or other remote electronic devices 100 via a communication network(s) 340. For example, network(s) 340 may include wireless networks, e.g., wireless local area networks, and one or more public networks such as the Internet.

Figure 4:
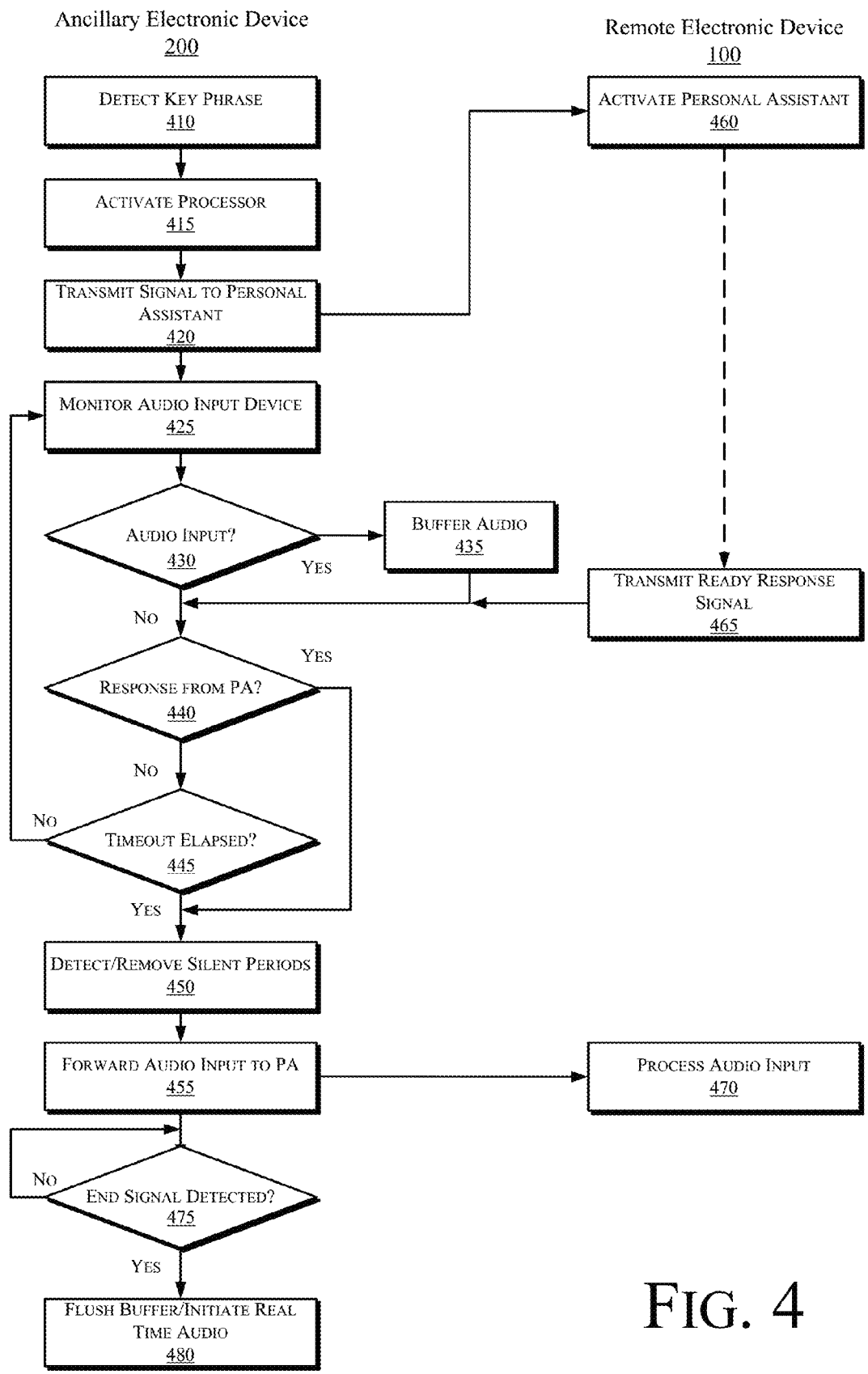
FIG. 4 is a flowchart illustrating operations in a method to implement intelligent ancillary devices in accordance with some examples.
Figure 5:
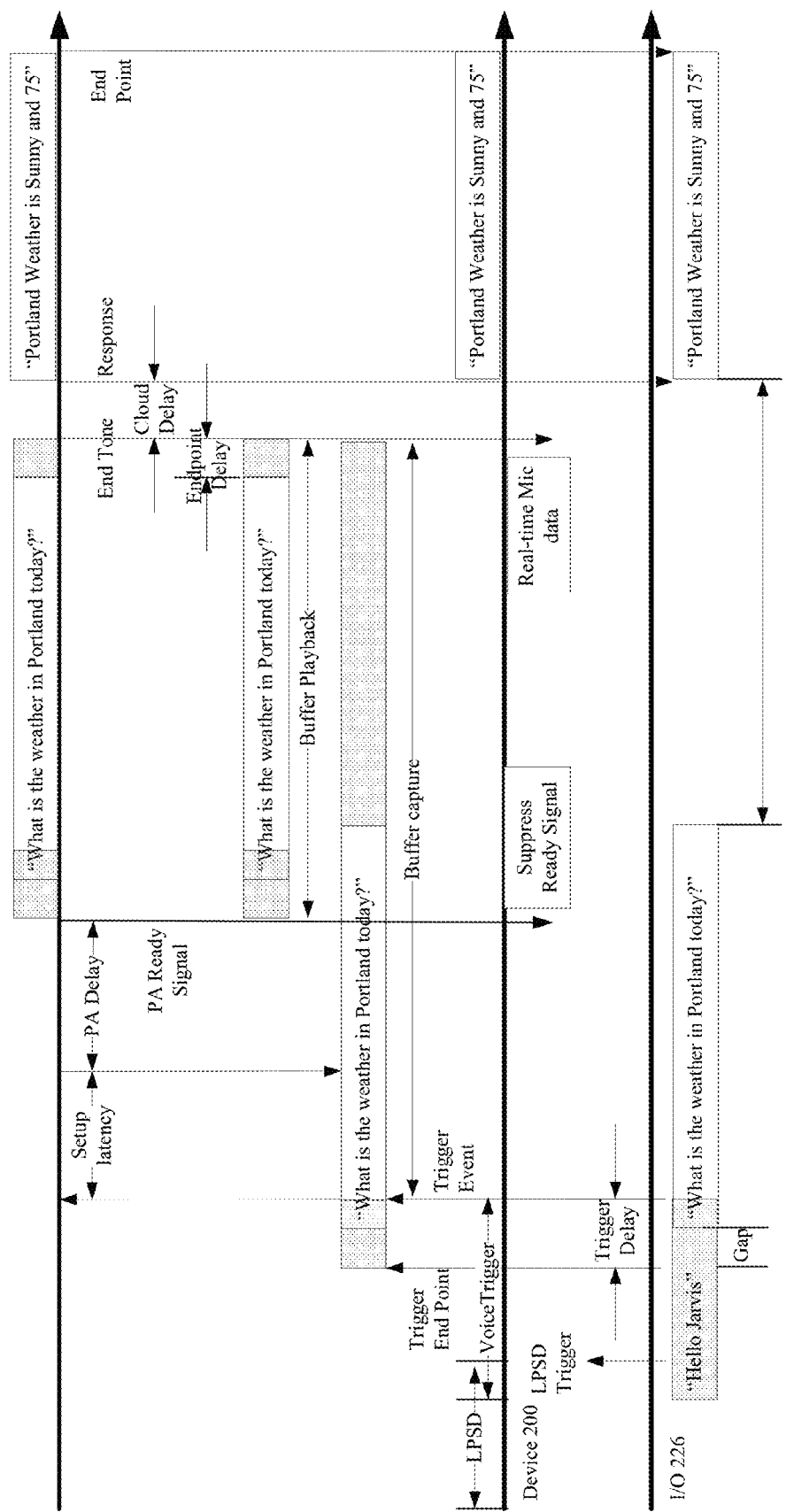
FIG. 5 is a timing diagram of communication between electronic devices in accordance with some examples.

Having described various structures to implement ancillary electronic devices, operating aspects will be explained with reference to FIGS. 4-5. FIG. 4 is a flowchart illustrating operations in a method to implement intelligent ancillary devices in accordance with some examples, and FIG. 5 is a timing diagram of communication between electronic devices in accordance with some examples. Some operations depicted in the flowchart of FIG. 4 may be implemented by the personal assistant manager 242 of the ancillary electronic device 200.

Referring to FIGS. 4 and 5, at operation 410 the ancillary electronic device 200 detects a key phrase. For example, in some examples the LPSD 277 may detect the receipt of a voice input into a microphone that corresponds to a designated key phrase. For example, referring briefly to FIG. 5, in some examples a user may input a key phrase (e.g., "Hello Jarvis") to an input/output device 226 such as a microphone. The key phrase functions as a trigger to the LPSD 277.

The LPSD 277 receives the key phrase and, at operation 415, the LPSD 277 generates a signal which activates a processor 224 on ancillary electronic device 200. At operation 420 the processor 224 transmits a signal to the personal assistant(s) 142/178 which execute on remote electronic device 100. As illustrated in FIG. 5 a setup latency will be incurred while the personal assistant(s) 142/178 which execute on remote electronic device 100 go through the setup process.

At operation 425 the ancillary electronic device 200 continues to monitor for voice inputs into a microphone on ancillary electronic device 200.

If, at operation 430, audio input is received then control passes to operation 435 and the ancillary electronic device 200 buffers the received audio in a memory, e.g., memory 240. In some examples the ancillary electronic device 200 may block presentation of a ready response from the remote electronic device 100 until the audio input is finished. By contrast, if there is no audio input at operation 430 then control passes to operation 440 it is determined whether the ancillary electronic device has received a response from the personal assistant(s) 142/178 executing on remote electronic device 100.

If, at operation 440, a response has not been received then control passes to operation 445 and it is determined whether a timeout threshold has elapsed. If, at operation 445, the timeout threshold has not elapsed then control passes back to operation 425 and the ancillary electronic device 200 continues to monitor for voice inputs into a microphone on ancillary electronic device. By contrast, if at operation 445 the timeout period has elapsed then control passes to operation 450.

Thus, the operations 425-445 define a loop pursuant to which the ancillary electronic device 200 enables a user to continue providing a question to the personal assistant(s) 142/178 executing on remote electronic device 100 without waiting for a response from the personal assistant(s) 142/178 executing on the electronic device 100 indicating that the personal assistant(s) 142/178 executing on the electronic device 100 are ready. Rather, the user can enter the question and the ancillary electronic device 200 buffers the question in memory 240.

For example, referring back to FIG. 5, a user may enter the key phrase "Hello Jarvis" followed by a question, e.g., "What is the weather in Portland today?" The personal assistant manager(s) executing on ancillary electronic device 200 cause the question "What is the weather in Portland today?" to be buffered in memory 240.

Referring back to FIG. 4, at operation 460 the remote electronic device 100 activates the personal assistant(s) 142/178 executing on remote electronic device in response to the signal transmitted in operation 420. The setup process for personal assistant(s) 142/178 introduces a delay. Referring to FIG. 5, the delay is indicated by PA Delay. When the personal assistant(s) 142/178 are ready control passes to operation 465 and the personal assistant(s) 142/178 transmit a signal indicating that they are ready to the ancillary electronic device 200. This signal is indicated by as a PA Ready Signal in FIG. 5.

Receipt of the ready response signal from remote electronic device 100 or the elapse of the timeout period causes the loop defined by operations 425-445 to terminate and control to pass to operation 450, which is an optional operation.

At operation 450 the ancillary electronic device 200 optionally detects and removes silent periods in the speech buffered in memory 240. For example, a speech analyzer may analyze the speech buffered in memory 240 and may delete data corresponding to silent periods which are greater than a threshold amount of time. In an alternate example the data corresponding to silent periods need not be deleted from memory 140. Rather, the data corresponding to silent periods may be identified as silent data.

At operation 455 the ancillary electronic device 200 forwards the buffered audio to the personal assistant(s) 142/178 executing on remote electronic device 100. In examples in which buffered data corresponding to silent periods is identified, rather than deleted, the buffered data corresponding to silent periods need not be transferred. In some examples the audio may be forwarded in a burst mode at an accelerated data rate to expedite delivery of the question to the personal assistant(s) 142/178 executing on remote electronic device 100.

At operation 470 the remote electronic device 100 processes the audio input in accordance with normal processing operations. Thus, referring to FIG. 5, the personal assistant(s) executing on remote electronic device may receive the question, obtain an answer, and forward the answer to the ancillary electronic device 200.

At operation 475 the ancillary electronic device monitors for an end signal from the remote electronic device. For example, the personal assistant 142/178 on remote electronic device 100 may transmit a signal which indicates that the personal assistant 142/178 received the audio input and is processing the input. If, at operation 475 an end signal is detected then control passes to operation 480 and the ancillary electronic device 200 can simply flush the audio buffer and initiate a real-time audio transfer.

Figure 6:
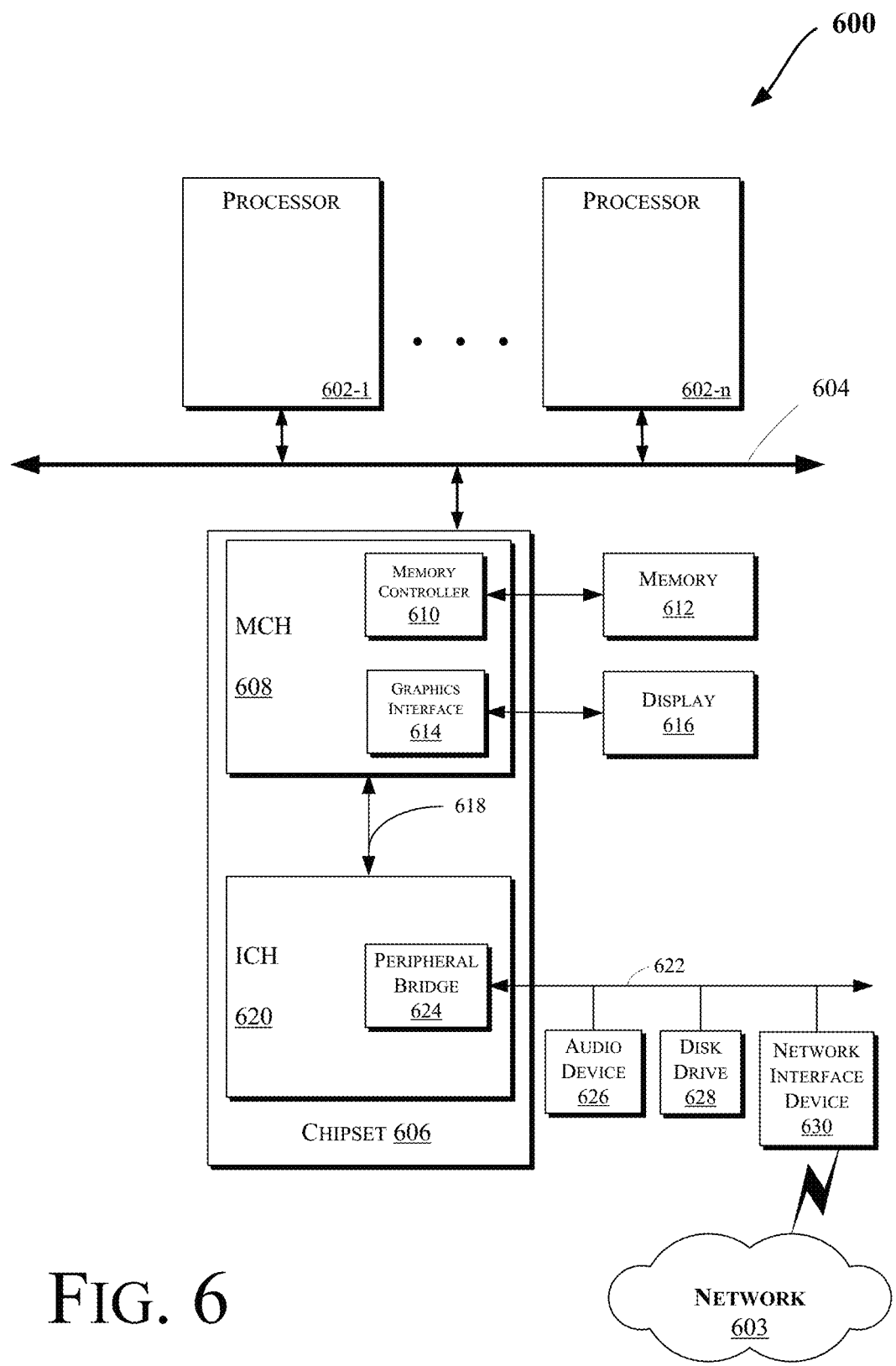
FIGS. 6-10 are schematic illustrations of electronic devices which may be adapted to implement intelligent recording in accordance with some examples.

As described above, in some examples the electronic device may be embodied as a computer system. FIG. 6 illustrates a block diagram of a computing system 600 in accordance with an example. The computing system 600 may include one or more central processing unit(s) 602 or processors that communicate via an interconnection network (or bus) 604. The processors 602 may include a general purpose processor, a network processor (that processes data communicated over a computer network 603), or other types of a processor (including a reduced instruction set computer (RISC) processor or a complex instruction set computer (CISC)). Moreover, the processors 602 may have a single or multiple core design. The processors 602 with a multiple core design may integrate different types of processor cores on the same integrated circuit (IC) die. Also, the processors 602 with a multiple core design may be implemented as symmetrical or asymmetrical multiprocessors. In an example, one or more of the processors 602 may be the same or similar to the processors 102 of FIG. 1. For example, one or more of the processors 602 may include the control unit 124 discussed with reference to FIG. 1 or processor 224 of FIG. 2. Also, the operations discussed with reference to FIGS. 4-5 may be performed by one or more components of the system 600.

A chipset 606 may also communicate with the interconnection network 604. The chipset 606 may include a memory control hub (MCH) 608. The MCH 608 may include a memory controller 610 that communicates with a memory 612. The memory 612 may store data, including sequences of instructions, that may be executed by the processor 602, or any other device included in the computing system 600. In one example, the memory 612 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 604, such as multiple processor(s) and/or multiple system memories.

The MCH 608 may also include a graphics interface 614 that communicates with a display device 616. In one example, the graphics interface 614 may communicate with the display device 616 via an accelerated graphics port (AGP). In an example, the display 616 (such as a flat panel display) may communicate with the graphics interface 614 through, for example, a signal converter that translates a digital representation of an image stored in a storage device such as video memory or system memory into display signals that are interpreted and displayed by the display 616. The display signals produced by the display device may pass through various control devices before being interpreted by and subsequently displayed on the display 616.

A hub interface 618 may allow the MCH 608 and an input/output control hub (ICH) 620 to communicate. The ICH 620 may provide an interface to I/O device(s) that communicate with the computing system 600. The ICH 620 may communicate with a bus 622 through a peripheral bridge (or controller) 624, such as a peripheral component interconnect (PCI) bridge, a universal serial bus (USB) controller, or other types of peripheral bridges or controllers. The bridge 624 may provide a data path between the processor 602 and peripheral devices. Other types of topologies may be utilized. Also, multiple buses may communicate with the ICH 620, e.g., through multiple bridges or controllers. Moreover, other peripherals in communication with the ICH 620 may include, in various examples, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 622 may communicate with an audio device 626, one or more disk drive(s) 628, and a network interface device 630 (which is in communication with the computer network 603). Other devices may communicate via the bus 622. Also, various components (such as the network interface device 630) may communicate with the MCH 608 in some examples. In addition, the processor 602 and one or more other components discussed herein may be combined to form a single chip (e.g., to provide a System on Chip (SOC)). Furthermore, the graphics accelerator 616 may be included within the MCH 608 in other examples.

Furthermore, the computing system 600 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 628), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

Figure 7:
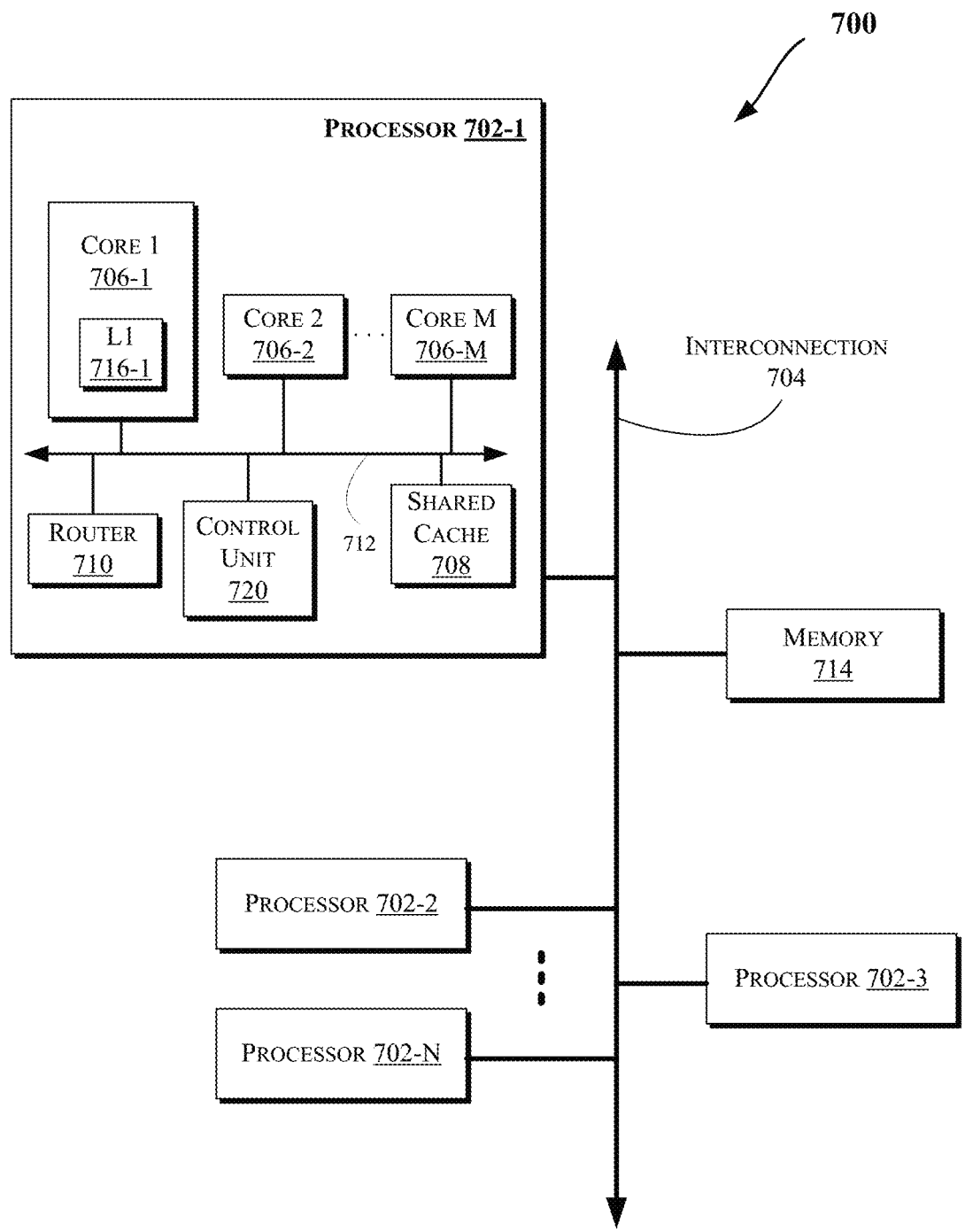

FIG. 7 illustrates a block diagram of a computing system 700, according to an example. The system 700 may include one or more processors 702-1 through 702-N (generally referred to herein as "processors 702" or "processor 702"). The processors 702 may communicate via an interconnection network or bus 704. Each processor may include various components some of which are only discussed with reference to processor 702-1 for clarity. Accordingly, each of the remaining processors 702-2 through 702-N may include the same or similar components discussed with reference to the processor 702-1.

In an example, the processor 702-1 may include one or more processor cores 706-1 through 706-M (referred to herein as "cores 706" or more generally as "core 706"), a shared cache 708, a router 710, and/or a processor control logic or unit 720. The processor cores 706 may be implemented on a single integrated circuit (IC) chip. Moreover, the chip may include one or more shared and/or private caches (such as cache 708), buses or interconnections (such as a bus or interconnection network 712), memory controllers, or other components.

In one example, the router 710 may be used to communicate between various components of the processor 702-1 and/or system 700. Moreover, the processor 702-1 may include more than one router 710. Furthermore, the multitude of routers 710 may be in communication to enable data routing between various components inside or outside of the processor 702-1.

The shared cache 708 may store data (e.g., including instructions) that are utilized by one or more components of the processor 702-1, such as the cores 706. For example, the shared cache 708 may locally cache data stored in a memory 714 for faster access by components of the processor 702. In an example, the cache 708 may include a mid-level cache (such as a level 2 (L2), a level 3 (L3), a level 4 (L4), or other levels of cache), a last level cache (LLC), and/or combinations thereof. Moreover, various components of the processor 702-1 may communicate with the shared cache 708 directly, through a bus (e.g., the bus 712), and/or a memory controller or hub. As shown in FIG. 7, in some examples, one or more of the cores 706 may include a level 1 (L1) cache 716-1 (generally referred to herein as "L1 cache 716").

Figure 8:
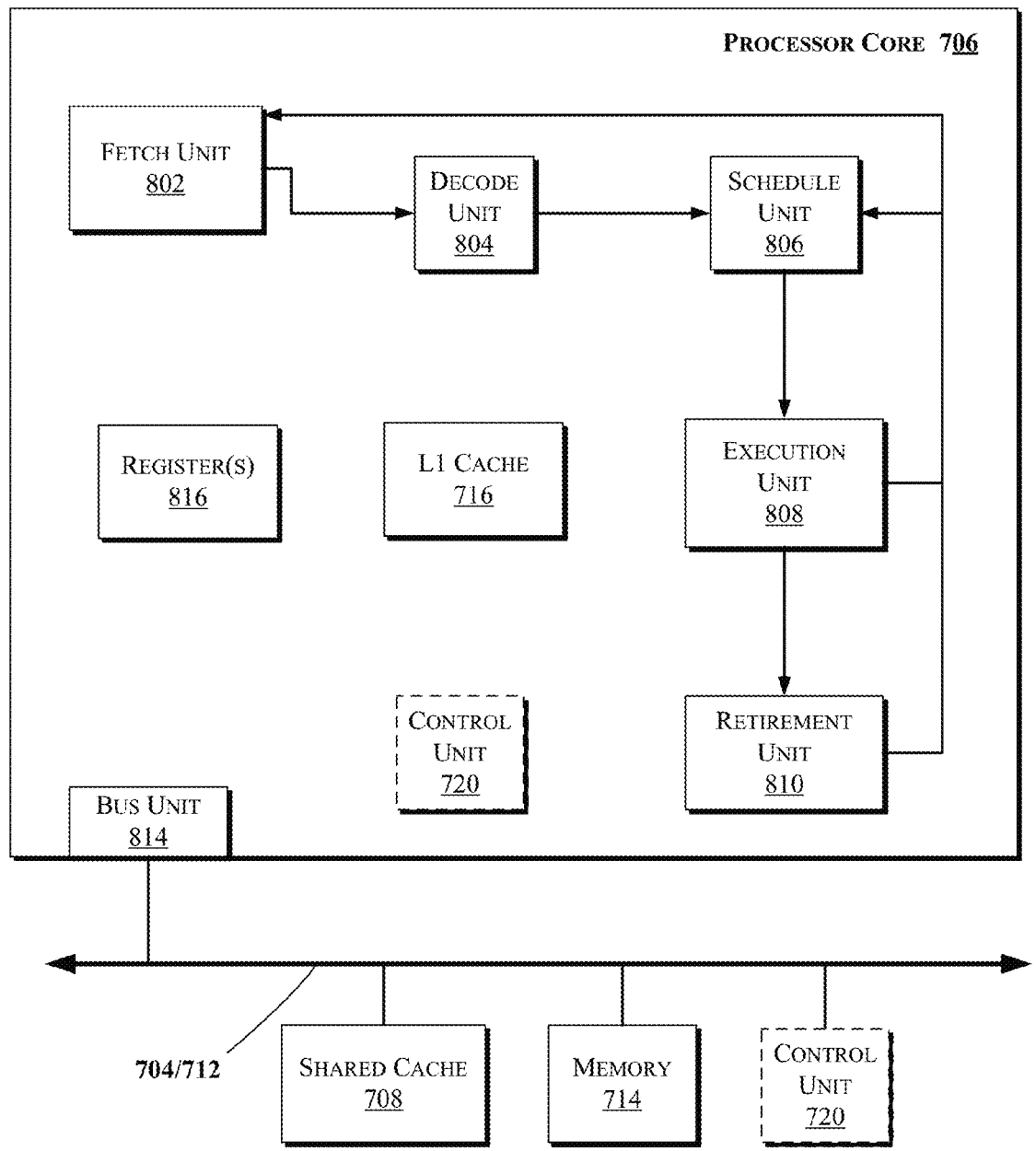

FIG. 8 illustrates a block diagram of portions of a processor core 706 and other components of a computing system, according to an example. In one example, the arrows shown in FIG. 8 illustrate the flow direction of instructions through the core 706. One or more processor cores (such as the processor core 706) may be implemented on a single integrated circuit chip (or die) such as discussed with reference to FIG. 7. Moreover, the chip may include one or more shared and/or private caches (e.g., cache 708 of FIG. 7), interconnections (e.g., interconnections 704 and/or 112 of FIG. 7), control units, memory controllers, or other components.

As illustrated in FIG. 8, the processor core 706 may include a fetch unit 802 to fetch instructions (including instructions with conditional branches) for execution by the core 706. The instructions may be fetched from any storage devices such as the memory 714. The core 706 may also include a decode unit 804 to decode the fetched instruction. For instance, the decode unit 804 may decode the fetched instruction into a plurality of uops (micro-operations).

Additionally, the core 706 may include a schedule unit 806. The schedule unit 806 may perform various operations associated with storing decoded instructions (e.g., received from the decode unit 804) until the instructions are ready for dispatch, e.g., until all source values of a decoded instruction become available. In one example, the schedule unit 806 may schedule and/or issue (or dispatch) decoded instructions to an execution unit 808 for execution. The execution unit 808 may execute the dispatched instructions after they are decoded (e.g., by the decode unit 804) and dispatched (e.g., by the schedule unit 806). In an example, the execution unit 808 may include more than one execution unit. The execution unit 808 may also perform various arithmetic operations such as addition, subtraction, multiplication, and/or division, and may include one or more an arithmetic logic units (ALUs). In an example, a co-processor (not shown) may perform various arithmetic operations in conjunction with the execution unit 808.

Further, the execution unit 808 may execute instructions out-of-order. Hence, the processor core 706 may be an out-of-order processor core in one example. The core 706 may also include a retirement unit 810. The retirement unit 810 may retire executed instructions after they are committed. In an example, retirement of the executed instructions may result in processor state being committed from the execution of the instructions, physical registers used by the instructions being de-allocated, etc.

The core 706 may also include a bus unit 714 to enable communication between components of the processor core 706 and other components (such as the components discussed with reference to FIG. 8) via one or more buses (e.g., buses 804 and/or 812). The core 706 may also include one or more registers 816 to store data accessed by various components of the core 706 (such as values related to power consumption state settings).

Furthermore, even though FIG. 7 illustrates the control unit 720 to be coupled to the core 706 via interconnect 812, in various examples the control unit 720 may be located elsewhere such as inside the core 706, coupled to the core via bus 704, etc.

Figure 9:
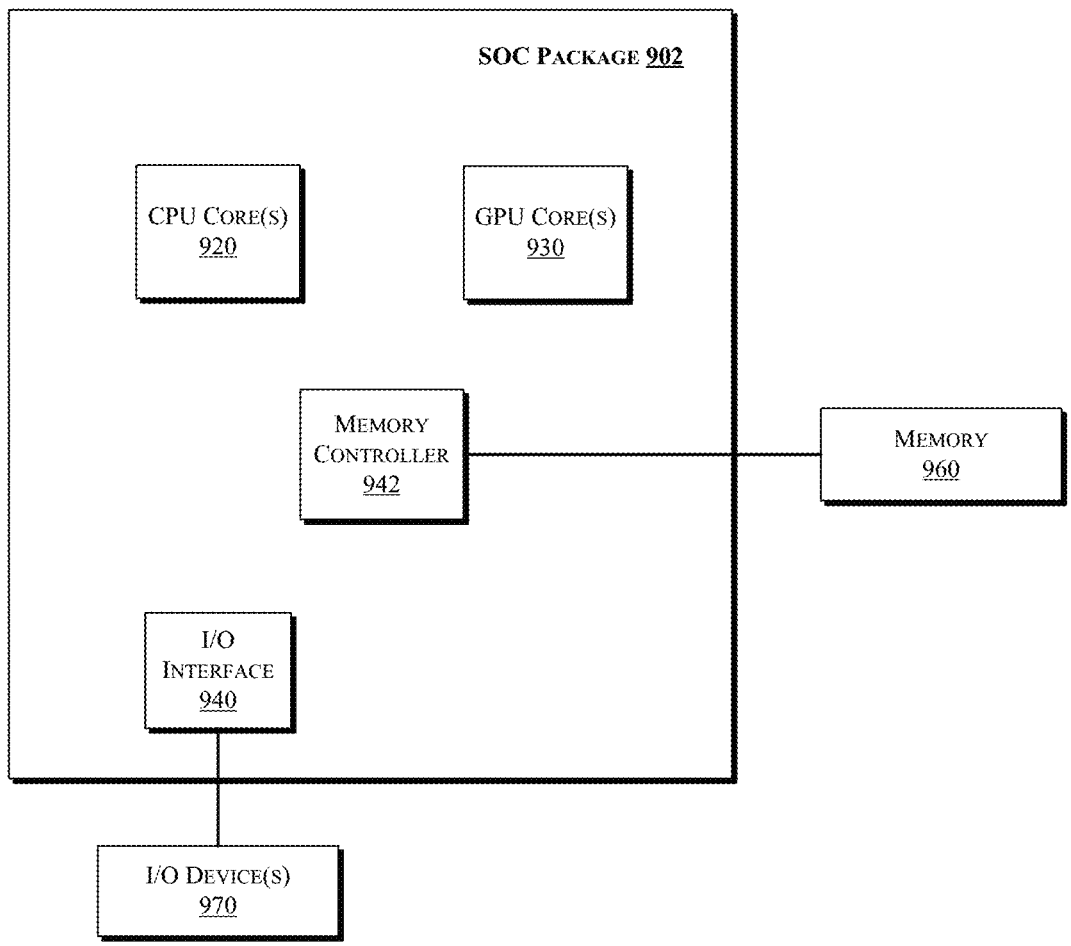

In some examples, one or more of the components discussed herein can be embodied as a System On Chip (SOC) device. FIG. 9 illustrates a block diagram of an SOC package in accordance with an example. As illustrated in FIG. 9, SOC 902 includes one or more processor cores 920, one or more graphics processor cores 930, an Input/Output (I/O) interface 940, and a memory controller 942. Various components of the SOC package 902 may be coupled to an interconnect or bus such as discussed herein with reference to the other figures. Also, the SOC package 902 may include more or less components, such as those discussed herein with reference to the other figures. Further, each component of the SOC package 902 may include one or more other components, e.g., as discussed with reference to the other figures herein. In one example, SOC package 902 (and its components) is provided on one or more Integrated Circuit (IC) die, e.g., which are packaged into a single semiconductor device.

As illustrated in FIG. 9, SOC package 902 is coupled to a memory 960 (which may be similar to or the same as memory discussed herein with reference to the other figures) via the memory controller 942. In an example, the memory 960 (or a portion of it) can be integrated on the SOC package 902.

The I/O interface 940 may be coupled to one or more I/O devices 970, e.g., via an interconnect and/or bus such as discussed herein with reference to other figures. I/O device(s) 970 may include one or more of a keyboard, a mouse, a touchpad, a display, an image/video capture device (such as a camera or camcorder/video recorder), a touch surface, a speaker, or the like.

Figure 10:
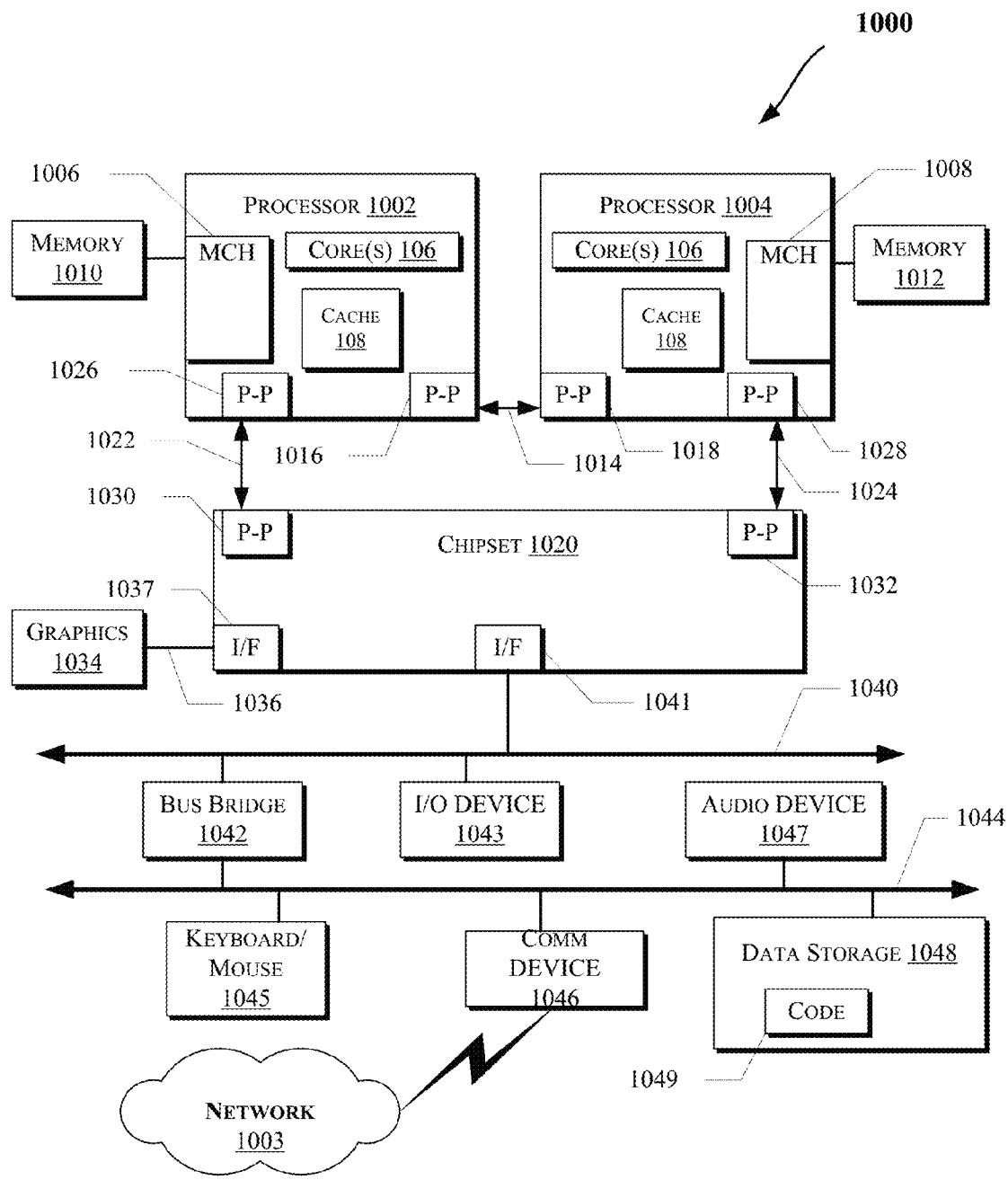

FIG. 10 illustrates a computing system 1000 that is arranged in a point-to-point (PtP) configuration, according to an example. In particular, FIG. 10 shows a system where processors, memory, and input/output devices are interconnected by a number of point-to-point interfaces. The operations discussed with reference to FIG. 2 may be performed by one or more components of the system 1000.

As illustrated in FIG. 10, the system 1000 may include several processors, of which only two, processors 1002 and 1004 are shown for clarity. The processors 1002 and 1004 may each include a local memory controller hub (MCH) 1006 and 1008 to enable communication with memories 1010 and 1012. MCH 1006 and 1008 may include the memory controller 120 and/or logic 125 of FIG. 1 in some examples.

In an example, the processors 1002 and 1004 may be one of the processors 702 discussed with reference to FIG. 7. The processors 1002 and 1004 may exchange data via a point-to-point (PtP) interface 1014 using PtP interface circuits 1016 and 1018, respectively. Also, the processors 1002 and 1004 may each exchange data with a chipset 1020 via individual PtP interfaces 1022 and 1024 using point-to-point interface circuits 1026, 1028, 1030, and 1032. The chipset 1020 may further exchange data with a high-performance graphics circuit 1034 via a high-performance graphics interface 1036, e.g., using a PtP interface circuit 1037.

As shown in FIG. 10, one or more of the cores 106 and/or cache 108 of FIG. 1 may be located within the processors 1004. Other examples, however, may exist in other circuits, logic units, or devices within the system 1000 of FIG. 10. Furthermore, other examples may be distributed throughout several circuits, logic units, or devices illustrated in FIG. 10.

The chipset 1020 may communicate with a bus 1040 using a PtP interface circuit 1041. The bus 1040 may have one or more devices that communicate with it, such as a bus bridge 1042 and I/O devices 1043. Via a bus 1044, the bus bridge 1043 may communicate with other devices such as a keyboard/mouse 1045, communication devices 1046 (such as modems, network interface devices, or other communication devices that may communicate with the computer network 1003), audio I/O device, and/or a data storage device 1048. The data storage device 1048 (which may be a hard disk drive or a NAND flash based solid state drive) may store code 1049 that may be executed by the processors 1004.

The following examples pertain to further examples.

Example 1 is a controller comprising logic, at least partially including hardware logic, configured to detect a key phrase in a received audio signal, and, in response to the key phrase, to transmit a signal to a personal assistant in a remote electronic device, determine whether an audio input was received, and in response to a determination that additional audio input was received prior to receiving a response from the personal assistant in the remote electronic device, to buffer the audio input in a memory, and forward the audio input to the personal assistant in the remote electronic device In Example 2, the subject matter of Example 1 can optionally include an arrangement in which the logic includes a low-power controller to detect a key phrase in a received audio signal.

In Example 3, the subject matter of any one of Examples 1-2 can optionally include logic further configured to activate a processor in response to a determination that additional audio input was received prior to receiving a response from the personal assistant manager in the remote electronic device.

In Example 4, the subject matter of any one of Examples 1-3 can optionally include logic further configured to monitor for a ready response from the personal assistant in the remote electronic device.

In Example 5, the subject matter of any one of Examples 1-4 can optionally include logic further configured to block presentation of the ready response from the personal assistant in response to a determination that additional audio input was received prior to receiving a response from the personal assistant in the remote electronic device.

In Example 6, the subject matter of any one of Examples 1-5 can optionally include logic further configured to transmit the audio input from the memory to the remote electronic device.

In Example 7, the subject matter of any one of Examples 1-6 can optionally include logic further configured to detect a period of silence in the audio input buffered in memory, and remove the period of silence from the audio input buffered in memory before the audio input buffered in memory is transmitted to the remote electronic device.

In Example 8, the subject matter of any one of Examples 1-7 can optionally include logic further configured to transmit the audio input from the memory to the remote electronic device comprises logic to transmit the audio input in a burst mode at an accelerated data rate.

Example 9 is an electronic device, comprising an audio input device, a communication interface, and a controller comprising logic, at least partially including hardware logic, configured to detect a key phrase in a received audio signal, and, in response to the key phrase, to transmit a signal to a personal assistant in a remote electronic device, determine whether an audio input was received, and in response to a determination that additional audio input was received prior to receiving a response from the personal assistant in the remote electronic device, to buffer the audio input in a memory, and forward the audio input to the personal assistant in the remote electronic device In Example 10, the subject matter of Example 9 can optionally include an arrangement in which the logic includes a low-power controller to detect a key phrase in a received audio signal.

In Example 11, the subject matter of any one of Examples 9-10 can optionally include logic further configured to activate a processor in response to a determination that additional audio input was received prior to receiving a response from the personal assistant manager in the remote electronic device.

In Example 12, the subject matter of any one of Examples 9-11 can optionally include logic further configured to monitor for a ready response from the personal assistant in the remote electronic device.

In Example 13, the subject matter of any one of Examples 9-12 can optionally include logic further configured to block presentation of the ready response from the personal assistant in response to a determination that additional audio input was received prior to receiving a response from the personal assistant in the remote electronic device.

In Example 14, the subject matter of any one of Examples 9-13 can optionally include logic further configured to transmit the audio input from the memory to the remote electronic device.

In Example 15, the subject matter of any one of Examples 9-14 can optionally include logic further configured to detect a period of silence in the audio input buffered in memory, and remove the period of silence from the audio input buffered in memory before the audio input buffered in memory is transmitted to the remote electronic device.

In Example 16, the subject matter of any one of Examples 9-15 can optionally include logic further configured to transmit the audio input from the memory to the remote electronic device comprises logic to transmit the audio input in a burst mode at an accelerated data rate.

Example 17 is an electronic device, comprising an audio input device, a communication interface, and means for detecting a key phrase in a received audio signal, and in response to the key phrase, for transmitting a signal to a personal assistant in a remote electronic device, determining whether an audio input was received, and in response to a determination that additional audio input was received prior to receiving a response from the personal assistant in the remote electronic device, to buffering the audio input in a memory, and forwarding the audio input to the personal assistant in the remote electronic device.

In Example 18 the subject matter of Example 17 can optionally include an arrangement in which the logic includes a low-power controller to detect a key phrase in a received audio signal.

In Example 19 the subject matter of any one of Examples 17-18 can optionally include logic further configured to activate a processor in response to a determination that additional audio input was received prior to receiving a response from the personal assistant manager in the remote electronic device.

In Example 20 the subject matter of any one of Examples 17-19 can optionally include logic further configured to monitor for a ready response from the personal assistant in the remote electronic device.

In Example 21 the subject matter of any one of Examples 17-20 can optionally include logic further configured to block presentation of the ready response from the personal assistant in response to a determination that additional audio input was received prior to receiving a response from the personal assistant in the remote electronic device.

In Example 22 the subject matter of any one of Examples 17-21 can optionally include logic further configured to transmit the audio input from the memory to the remote electronic device.

In Example 23 the subject matter of any one of Examples 17-22 can optionally include logic further configured to detect a period of silence in the audio input buffered in memory, and remove the period of silence from the audio input buffered in memory before the audio input buffered in memory is transmitted to the remote electronic device.

In Example 24 the subject matter of any one of Examples 17-23 can optionally include logic further configured to transmit the audio input from the memory to the remote electronic device comprises logic to transmit the audio input in a burst mode at an accelerated data rate.

Example 25 is a computer program product comprising logic instructions stored on a tangible computer readable medium which, when executed by a controller, configure the controller to detect a key phrase in a received audio signal and in response to the key phrase, to transmit a signal to a personal assistant in a remote electronic device, determine whether an audio input was received, and in response to a determination that additional audio input was received prior to receiving a response from the personal assistant in the remote electronic device, to buffer the audio input in a memory, and forward the audio input to the personal assistant in the remote electronic device.

In Example 26 the subject matter of Example 25 can optionally include an arrangement in which the logic includes a low-power controller to detect a key phrase in a received audio signal.

In Example 27 the subject matter of any one of Examples 25-26 can optionally include logic instructions stored on a tangible computer readable medium which, when executed by the controller, configure the controller activate a processor in response to a determination that additional audio input was received prior to receiving a response from the personal assistant manager in the remote electronic device.

In Example 28 the subject matter of any one of Examples 25-27 can optionally include logic instructions stored on a tangible computer readable medium which, when executed by the controller, configure the controller monitor for a ready response from the personal assistant in the remote electronic device.

In Example 29 the subject matter of any one of Examples 25-28 can optionally include logic instructions stored on a tangible computer readable medium which, when executed by the controller, configure the controller to block presentation of the ready response from the personal assistant in response to a determination that additional audio input was received prior to receiving a response from the personal assistant in the remote electronic device.

In Example 30 the subject matter of any one of Examples 25-29 can optionally include comprising logic instructions stored on a tangible computer readable medium which, when executed by the controller, configure the controller transmit the audio input from the memory to the remote electronic device.

In Example 31 the subject matter of any one of Examples 25-30 can optionally include logic instructions stored on a tangible computer readable medium which, when executed by the controller, configure the controller detect a period of silence in the audio input buffered in memory, and remove the period of silence from the audio input buffered in memory before the audio input buffered in memory is transmitted to the remote electronic device.

In Example 32 the subject matter of any one of Examples 25-31 can optionally include comprising logic instructions stored on a tangible computer readable medium which, when executed by the controller, configure the controller transmit the audio input from the memory to the remote electronic device comprises logic to transmit the audio input in a burst mode at an accelerated data rate.

Example 33 is a method, comprising detecting a key phrase in a received audio signal and in response to the key phrase transmitting a signal to a personal assistant in a remote electronic device, determining whether an audio input was received, and in response to a determination that additional audio input was received prior to receiving a response from the personal assistant in the remote electronic device, buffering the audio input in a memory, and forwarding the audio input to the personal assistant in the remote electronic device.

In Example 34, the subject matter of Example 33 can optionally include an arrangement in which the logic includes a low-power controller to detect a key phrase in a received audio signal.

In Example 35, the subject matter of any one of Examples 33-34 can optionally include logic further configured to activate a processor in response to a determination that additional audio input was received prior to receiving a response from the personal assistant manager in the remote electronic device.

In Example 36, the subject matter of any one of Examples 33-35 can optionally include logic further configured to monitor for a ready response from the personal assistant in the remote electronic device.

In Example 37, the subject matter of any one of Examples 33-36 can optionally include logic further configured to block presentation of the ready response from the personal assistant in response to a determination that additional audio input was received prior to receiving a response from the personal assistant in the remote electronic device.

In Example 38, the subject matter of any one of Examples 33-37 can optionally include logic further configured to transmit the audio input from the memory to the remote electronic device.

In Example 39, the subject matter of any one of Examples 33-38 can optionally include logic further configured to detect a period of silence in the audio input buffered in memory, and remove the period of silence from the audio input buffered in memory before the audio input buffered in memory is transmitted to the remote electronic device.

In Example 40, the subject matter of any one of Examples 33-39 can optionally include logic further configured to transmit the audio input from the memory to the remote electronic device comprises logic to transmit the audio input in a burst mode at an accelerated data rate.

The terms "logic instructions" as referred to herein relates to expressions which may be understood by one or more machines for performing one or more logical operations. For example, logic instructions may comprise instructions which are interpretable by a processor compiler for executing one or more operations on one or more data objects. However, this is merely an example of machine-readable instructions and examples are not limited in this respect.

The terms "computer readable medium" as referred to herein relates to media capable of maintaining expressions which are perceivable by one or more machines. For example, a computer readable medium may comprise one or more storage devices for storing computer readable instructions or data. Such storage devices may comprise storage media such as, for example, optical, magnetic or semiconductor storage media. However, this is merely an example of a computer readable medium and examples are not limited in this respect.

The term "logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA). Also, logic may comprise machine-readable instructions stored in a memory in combination with processing circuitry to execute such machine-readable instructions. However, these are merely examples of structures which may provide logic and examples are not limited in this respect.

Some of the methods described herein may be embodied as logic instructions on a computer-readable medium. When executed on a processor, the logic instructions cause a processor to be programmed as a special-purpose machine that implements the described methods. The processor, when configured by the logic instructions to execute the methods described herein, constitutes structure for performing the described methods. Alternatively, the methods described herein may be reduced to logic on, e.g., a field programmable gate array (FPGA), an application specific integrated circuit (ASIC) or the like.

In the description and claims, the terms coupled and connected, along with their derivatives, may be used. In particular examples, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

Reference in the specification to "one example" or "some examples" means that a particular feature, structure, or characteristic described in connection with the example is included in at least an implementation. The appearances of the phrase "in one example" in various places in the specification may or may not be all referring to the same example.

Although examples have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A controller, comprising:
logic, at least partially including hardware logic, configured to:
detect a key phrase in a received audio signal; and
in response to the key phrase, to:
transmit a signal to a personal assistant in a remote electronic device;
determine whether an audio input was received; and
in response to a determination that additional audio input was received prior to receiving a response from the personal assistant in the remote electronic device, to:
buffer the audio input in a memory;
forward the audio input to the personal assistant in the remote electronic device;
monitor for a ready response from the personal assistant in the remote electronic device;
block presentation of the ready response from the personal assistant in response to a determination that additional audio input was received prior to receiving a response from the personal assistant in the remote electronic device;
transmit the audio input from the memory to the remote electronic device detect a period of silence in the audio input buffered in memory; and
remove the period of silence from the audio input buffered in memory before the audio input buffered in memory is transmitted to the remote electronic device.

2. The controller of claim 1, wherein the logic includes a low-power controller to detect a key phrase in a received audio signal.

3. The controller of claim 2, comprising logic to activate a processor in response to a determination that additional audio input was received prior to receiving a response from the personal assistant manager in the remote electronic device.

4. The controller of claim 1, wherein the logic to transmit the audio input from the memory to the remote electronic device comprises logic to transmit the audio input in a burst mode at an accelerated data rate.

5. An electronic device, comprising:
an audio input device;
a communication interface; and
a controller, comprising:
logic, at least partially including hardware logic, configured to:
detect a key phrase in a received audio signal; and
in response to the key phrase, to:
transmit a signal to a personal assistant in a remote electronic device;
determine whether an audio input was received; and
in response to a determination that additional audio input was received prior to receiving a response from the personal assistant in the remote electronic device, to:
buffer the audio input in a memory;
forward the audio input to the personal assistant in the remote electronic device;
monitor for a ready response from the personal assistant in the remote electronic device;
block presentation of the ready response from the personal assistant in response to a determination that additional audio input was received prior to receiving a response from the personal assistant in the remote electronic device;
transmit the audio input from the memory to the remote electronic device detect a period of silence in the audio input buffered in memory; and
remove the period of silence from the audio input buffered in memory before the audio input buffered in memory is transmitted to the remote electronic device.

6. The electronic device of claim 5, wherein the logic includes a low-power controller to detect a key phrase in a received audio signal.

7. The electronic device of claim 6, comprising logic to activate a processor in response to a determination that additional audio input was received prior to receiving a response from the personal assistant in the remote electronic device.

8. The electronic device of claim 5, wherein the logic to transmit the audio input from the memory to the remote electronic device comprises logic to transmit the audio input in a burst mode at an accelerated data rate.

9. A non-transitory computer-readable medium comprising logic instructions stored on a tangible computer readable medium which, when executed by a controller, configure the controller to:
detect a key phrase in a received audio signal; and
in response to the key phrase, to:
transmit a signal to a personal assistant in a remote electronic device;
determine whether an audio input was received; and
in response to a determination that additional audio input was received prior to receiving a response from the personal assistant in the remote electronic device, to:
buffer the audio input in a memory; and
forward the audio input to the personal assistant in the remote electronic device;
monitor for a ready response from the personal assistant in the remote electronic device;
block presentation of the ready response from the personal assistant in response to a determination that additional audio input was received prior to receiving a response from the personal assistant in the remote electronic device;
transmit the audio input from the memory to the remote electronic device detect a period of silence in the audio input buffered in memory; and
remove the period of silence from the audio input buffered in memory before the audio input buffered in memory is transmitted to the remote electronic device.

10. The non-transitory computer-readable medium of claim 9, wherein the logic includes a low-power controller to detect a key phrase in a received audio signal.

11. The non-transitory computer-readable medium of claim 10, comprising logic instructions stored on a tangible computer readable medium which, when executed by the controller, configure the controller to activate a processor in response to a determination that additional audio input was received prior to receiving a response from the personal assistant in the remote electronic device.

12. The non-transitory computer-readable medium of claim 9, comprising logic instructions stored on a tangible computer readable medium which, when executed by the controller, configure the controller to transmit the audio input in a burst mode at an accelerated data rate.

\* \* \* \* \*